Oct. 22, 1963 L. ARTHAUD ETAL 3,107,409
SNAP FASTENER SOCKET
Filed Dec. 5, 1960

Inventors
Lucien Arthaud &
Martial Frassy,
by Walter P. Jones
Atty.

United States Patent Office 3,107,409
Patented Oct. 22, 1963

3,107,409
SNAP FASTENER SOCKET
Lucien Arthaud and Martial Frassy, Grenoble, France, assignors to A. Raymond, Grenoble, France, a firm
Filed Dec. 5, 1960, Ser. No. 73,572
Claims priority, application France Dec. 9, 1959
1 Claim. (Cl. 24—218)

The present invention relates to an improvement imparted to snap fasteners and more particularly to the socket member of this type of fastener.

An object of the invention is to provide a spring means of a combination of yieldable and elastic materials.

A further object of the invention is to provide a stud engaging means of moderately rigid but resilient material embedded in a washer of readily yieldable material.

Other objects of the invention will, in part, be obvious and will, in part, appear hereinafter.

Figure 3:
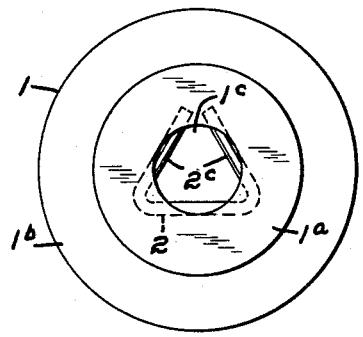
Figure 4:
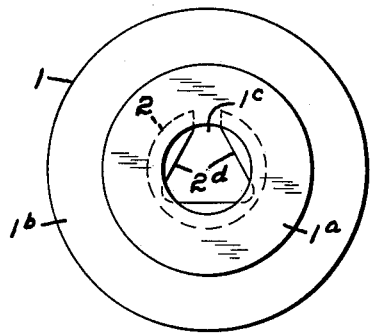
Figure 5:
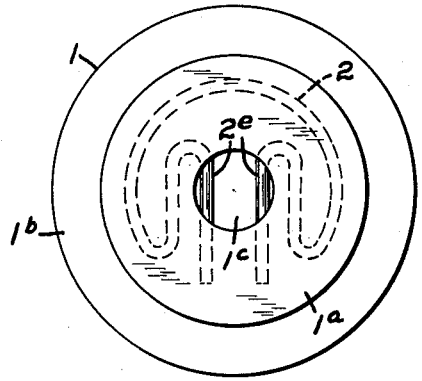
Figure 6:
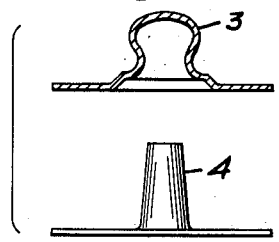
Figure 7:
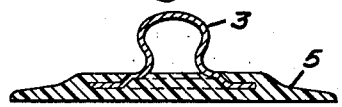
Figures 8, 9:
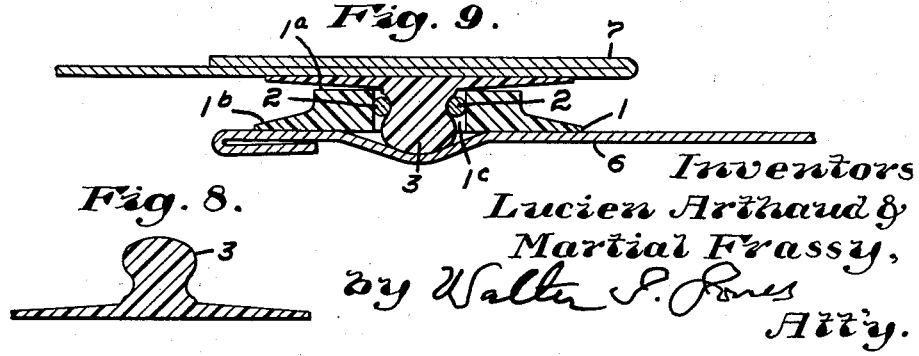

FIGS. 3, 4 and 5 each show a top plan view of modified socket members to illustrate variations of the invention;

FIGS. 6, 7 and 8 are sectional views of stud elements which can be used with the sockets shown in the preceding figures.

FIG. 9 is a sectional view showing a fastener attached by cementing or welding to a support.

Figure 1:
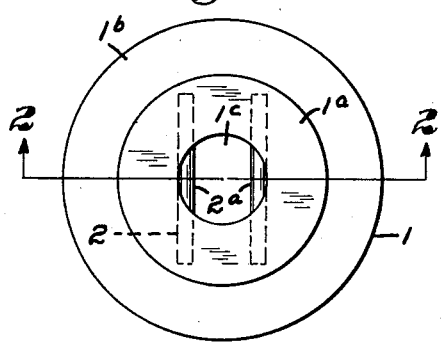
FIG. 1 is a top plan view of a socket member of a fastener made according to the invention.
Figure 2:
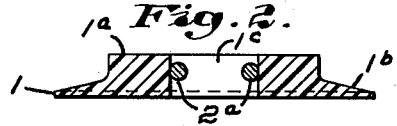
FIG. 2 is a section taken on line 2—2 of FIG. 1.

In the method of embodiment shown in FIG. 1, the female or socket part 1 of a push button or fastener is composed of a washer 1a of flexible and elastic material such as natural or synthetic rubber, or, too, a synthetic resin having similar properties.

The female or socket part is here designed to be used as is and the washer 1a has a base 1b of progressively decreasing thickness.

In the material constituting the washer is embedded a stud engaging means 2 formed of two small metal rods disposed parallel in such a way that their median parts 2a project on the edges of the central hole 1c of the washer.

The stud engaging means can have widely different forms;

In FIG. 3 it is composed of a single wire folded substantially in a triangle whereof the median parts 2c of each of the sides project on the edges of the central opening in the washer 1a.

In FIG. 4 the stud engaging means 2 is formed by a circular plate having a central cutout in the form of an open triangle at one of its apexes. The median portions 2d adjacent to the sides of the triangle also project into the central opening 1c.

In FIG. 5 the stud engaging means 2 is constituted by a wire bent in a rather complex fashion in such a way as to constitute an arc with a wide opening whereof the ends terminate in U-shaped portions. A part 2e of each inner arm of the said portions also projects on the edges of the opening 1c.

The female or socket part just described is designed to cooperate with a male part, comprising a head or ball 3 whose maximum diameter is superior to the width of the space separating the visible portions of the stud engaging means 2. This male part can be made in any form whatever, for example of stamped metal, as in FIG. 6, the attachment being assured by means of a rivet 4 or, again, by a base 5, of plastic material in which the base of the head is embedded (FIG. 7). The male part can also be made entirely of plastic as in FIG. 8.

The attachment of the button to its support can be done in any manner whatever.

In FIG. 9, the female part or socket part 1 and the male part 3 are attached to their support, 6 or 7 respectively, by cementing, for example with heat. We can also equip the base of each part with holes for attachment by sewing in the usual manner.

It goes without saying that modifications can be imparted to the embodiments just described, particularly by substitution of equivalent technical means, without thereby departing from the scope of the present invention.

We claim:

A fastener socket comprising a one-piece washer having an inner wall defining an aperture and stud engaging means, said stud engaging means having a geometric configuration open at one end, portions of said stud engaging means being embedded within the material of the washer and other portions of said stud engaging means, adjacent the embedded ends, forming a geometric section with portions of said inner wall, said stud engaging means being composed of substantially resilient material and said washer formed of substantially flexible molded material.

References Cited in the file of this patent
UNITED STATES PATENTS

| 1,203,224 | Marcus | Oct. 31, 1916 |

FOREIGN PATENTS

| 360,591 | France | Mar. 2, 1906 |
| 477,298 | France | July 12, 1915 |
| 1,050,718 | France | Sept. 2, 1953 |
| 1,172,521 | France | Oct. 20, 1958 |
| 1,039,005 | Germany | Sept. 18, 1958 |